US008047468B2

(12) United States Patent
Schmitz et al.

(10) Patent No.: US 8,047,468 B2
(45) Date of Patent: Nov. 1, 2011

(54) STOWAGE BIN WITH SHEAR FITTINGS (75) Inventors: Chad D. Schmitz, Arlington, WA (US); Joseph Matthias Manhardt, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/946,101

(22) Filed: Nov. 15, 2010

(65) Prior Publication Data

US 2011/0062284 A1 Mar. 17, 2011

Related U.S. Application Data (63) Continuation-in-part of application No. 12/545,957, filed on Aug. 24, 2009, now Pat. No. 7,832,685, and a continuation-in-part of application No. 11/250,689, filed on Oct. 14, 2005, now abandoned.

(51) Int. Cl.
*B64D 9/00* (2006.01)

(52) U.S. Cl. ............... 244/118.1; 244/129.4; 296/37.8; 312/248

(58) Field of Classification Search .............. 244/118.1, 244/118.2, 129.4, 137.1, 129.1; 296/37.7, 296/37.8; 312/246, 248
See application file for complete search history.

(56) References Cited

U.S. PATENT DOCUMENTS

| 4,275,942 | A | 6/1981 | Steidl |
| 4,368,937 | A | 1/1983 | Palombo et al. |
| 5,108,048 | A | 4/1992 | Chang |
| 5,244,269 | A | 9/1993 | Harriehausen et al. |
| 5,383,628 | A | 1/1995 | Harriehausen et al. |
| 5,456,529 | A | 10/1995 | Cheung |
| 5,567,028 | A | 10/1996 | Lutovsky et al. |
| 5,716,027 | A | 2/1998 | Hart et al. |
| 5,839,694 | A | 11/1998 | Bargull et al. |
| 5,842,668 | A | 12/1998 | Spencer |
| 5,868,353 | A | 2/1999 | Benard |
| 5,934,615 | A | 8/1999 | Treichler et al. |
| 6,007,024 | A | 12/1999 | Stephan |
| 6,045,204 | A | 4/2000 | Frazier et al. |
| 6,062,509 | A | 5/2000 | Burrows et al. |
| 6,318,671 | B1 | 11/2001 | Schumacher et al. |
| 6,398,163 | B1 | 6/2002 | Welch et al. |
| 6,484,969 | B2 | 11/2002 | Sprenger et al. |
| 6,691,951 | B2 | 2/2004 | Frazier |
| 6,769,831 | B2 | 8/2004 | Aquino et al. |
| 6,883,753 | B1 | 4/2005 | Scown |
| 7,097,138 | B2 | 8/2006 | Stephan et al. |
| 7,128,295 | B2 | 10/2006 | Scown |
| 7,143,977 | B2 | 12/2006 | Graf et al. |
| 7,258,406 | B2 | 8/2007 | Stephan et al. |
| 2003/0080247 | A1 | 5/2003 | Frazier |

(Continued)

OTHER PUBLICATIONS

USPTO Office Action for U.S. Appl. No. 12/545,957 dated Dec. 28, 2009.

(Continued)

*Primary Examiner* — Benjamin P Lee
(74) *Attorney, Agent, or Firm* — Yee & Associates, P.C.

(57) ABSTRACT

An aircraft stowage bin assembly includes shear fittings configured to route a content load from the bucket of the bin assembly to the airframe in the event of a forward load condition, such as a crash or severe turbulence. When the forward inertial load factor on the stowage bin is greater than about 1 g, the shear fittings create an efficient load path from the bucket to the airframe which bypasses the large metallic or composite endframes required by the designs of many conventional overhead stowage bins. As a result, significant reductions in overall bulk and weight, as well as lower manufacturing costs, can be realized.

21 Claims, 10 Drawing Sheets

U.S. PATENT DOCUMENTS

2005/0218264 A1   10/2005   Graf et al.
2005/0224643 A1   10/2005   Graf et al.
2006/0151668 A1   7/2006   Scown
2008/0078868 A1   4/2008   Lamoree et al.
2008/0277527 A1   11/2008   Fokken et al.

OTHER PUBLICATIONS

USPTO Final Office Action for U.S. Appl. No. 12/545,957 dated May 26, 2010.

USPTO Notice of Allowance for U.S. Appl. No. 12/545,957 dated Sep. 9, 2010.

STOWAGE BIN WITH SHEAR FITTINGS

CROSS-REFERENCED TO RELATED APPLICATIONS

This application is a continuation-in-part of application Ser. No. 11/250,689, filed Oct. 14, 2005, status abandoned, and the continuation application filed on Aug. 24, 2009, Ser. No. 12/545,957 now U.S. Pat. No. 7,832,685, status allowed.

BACKGROUND INFORMATION

1. Field

This disclosure relates generally to stowage bins and, more particularly, to overhead stowage bins in vehicle passenger cabins.

2. Background

Modern passenger airplanes often include overhead stowage bins in the passenger cabin for storage of carry-on luggage and other items. Such bins are often mounted with numerous mountings located along the ceiling and sidewalls of the passenger cabin. These mountings are typically designed to support a predetermined amount of weight within the bins during normal flight conditions. In addition, the mountings are designed to keep the bins securely fastened to the airframe in the event of a crash or severe turbulence.

For example, current FAA regulations require that each baggage compartment have a means to protect occupants from injury by the contents of the compartment when the ultimate forward inertial load factor exceeds 9 g. To satisfy this requirement, conventional overhead stowage bins are often designed to bear their content load into large endframes during a forward load condition, such as a crash. These large endframes, in turn, typically route the loads to connecting panels attached to the airframe.

Such conventional designs are usually effective for preventing bins from detaching from their mountings and falling completely or allowing items to fall on passengers' heads during a forward load condition, such as a crash. On the other hand, these conventional designs also present a number of drawbacks. For example, conventional overhead stowage bins are often bulky and somewhat heavy. In addition, conventional overhead stowage bins can be rather costly to manufacture and assemble. These drawbacks are becoming increasingly significant, as aircraft designers strive to develop more and more efficient aircraft designs.

SUMMARY

The above-mentioned drawbacks associated with existing overhead stowage bins are addressed by embodiments of the present invention, which will be understood by reading and studying the following specification.

In one embodiment, a stowage bin assembly comprises an upper panel comprising one or more first shear fitting components, a lower panel comprising one or more first shear fitting components, and a bucket comprising one or more second shear fitting components. The bucket is configured to cooperate with the upper panel and the lower panel such that, when the bin assembly is in a closed position, the first shear fitting components engage with the second shear fitting components to create a plurality of shear fittings capable of withstanding a substantial shear force between the bucket and the panels of the bin assembly.

In another embodiment, an aircraft overhead stowage bin comprises at least one support panel mounted to an interior portion of an airframe and one or more side panels coupled to the at least one support panel. The aircraft overhead stowage bin further comprises a bucket coupled to the one or more side panels, the bucket configured to contain a selected weight load, as well as means for routing the weight load from the bucket directly to the at least one support panel mounted to the airframe under a forward load condition.

In another embodiment, an aircraft comprises an airframe and one or more stowage bin assemblies mounted to the airframe. Each stowage bin assembly is configured to contain a selected weight load. In addition, each stowage bin assembly comprises one or more shear fittings configured to transfer the weight load directly from the stowage bin assembly to the airframe under a forward load condition.

In another embodiment, a method of securing a stowage bin within an aircraft comprises providing at least one support panel coupled to an airframe and providing a bucket coupled to the at least one support panel and configured to contain a selected weight load. The method further comprises securing the bucket to the at least one support panel with one or more shear fittings which, in the event of a forward load condition, transfer the weight load directly from the bucket to the at least one support panel coupled to the airframe.

In still a further advantageous embodiment, and still by way of example only, a storage bin and shear fitting assembly includes in combination a surface of the overhead storage bin, a vehicle frame, a male shear fitting component, and a female shear fitting component. The assembly is configured to transition between an open position, a first engagement position, and a closed position. The storage bin includes overhead storage bins such as those found in vehicles such as airplanes, ships, trains, and buses. The surface of the overhead storage bin includes a lateral wall of the storage bin. The vehicle frame also includes a vehicle fuselage as well as a bin support panel. The male shear fitting component may define a profile having a first region, a shoulder region, and a second region, wherein the first region is thicker than the second region, and wherein the shoulder region transitions between the first region and the second region. The male shear fitting further comprises one of a rounded tip or a chamfered tip. A lateral edge of the male shear fitting may be chamfered. The female shear fitting component may define a profile having a first receiving region, a shoulder receiving region, and a second receiving region, and wherein the first receiving region is wider than the second receiving region, and wherein the shoulder receiving region transitions between the first receiving region and the second receiving region. Either the male shear fitting component or the female shear fitting component may be disposed on the vehicle frame, and the other shear fitting component may be disposed on the surface of the storage bin.

Still describing features of the advantageous embodiment, the male shear fitting component and the female shear fitting component may be disengaged in the open position. In a first engagement position the second region of the male shear fitting may be disposed within the first receiving region of the female shear fitting. In a closed position the first region of the male shear fitting may be closely engaged within the first receiving region of the female shear fitting, the shoulder region of the male shear fitting may be closely engaged with the shoulder receiving region of the female shear fitting, and the second region of the male shear fitting may be closely engaged within the second receiving region of the female shear fitting. The male shear fitting component and the female shear fitting component may further comprise a base bracket for attaching the shear fitting to the storage bin surface and the vehicle frame.

Further describing other features of the advantageous embodiment, the profile of the first region of the male shear fitting may be characterized by a first wall and a second wall, and wherein the first wall and the second wall are substantially straight and parallel to each other; the profile of the second region of the male shear fitting may be characterized by a first wall and a second wall, and wherein the first wall and the second wall of the second region are substantially straight and parallel to each other. The width of second region of male shear fitting may be less than the width of the first receiving region of female shear fitting. The shoulder region of the male shear fitting and the shoulder receiving region of the female receiving region may be characterized by a slope of between approximately zero (0) degrees to approximately sixty (60) degrees from the vertical. In a further advantageous embodiment, the shoulder region of the male shear fitting component and the shoulder receiving region of the female shear fitting component may be characterized by a slope of between approximately ten (10) degrees to approximately forty-five (45) degrees from the vertical. In the closed position, the clearance between the male shear fitting and the female shear fitting may be between approximately 30 to approximately 50 thousandths of an inch in total. The shoulder region of the male shear fitting and the shoulder receiving region of the female shear fitting is characterized by being one of curved or substantially straight. In the closed position, a space may be defined between a tip of the male shear fitting and a bottom of the female shear fitting. The mass of the shear fitting is between approximately 0.13 to approximately 0.18.

The details of one or more embodiments of the claimed invention are set forth in the accompanying drawings and the description below. The features, functions, and advantages can be achieved independently in various embodiments of the claimed invention, or may be combined in yet other embodiments.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Figure 1:
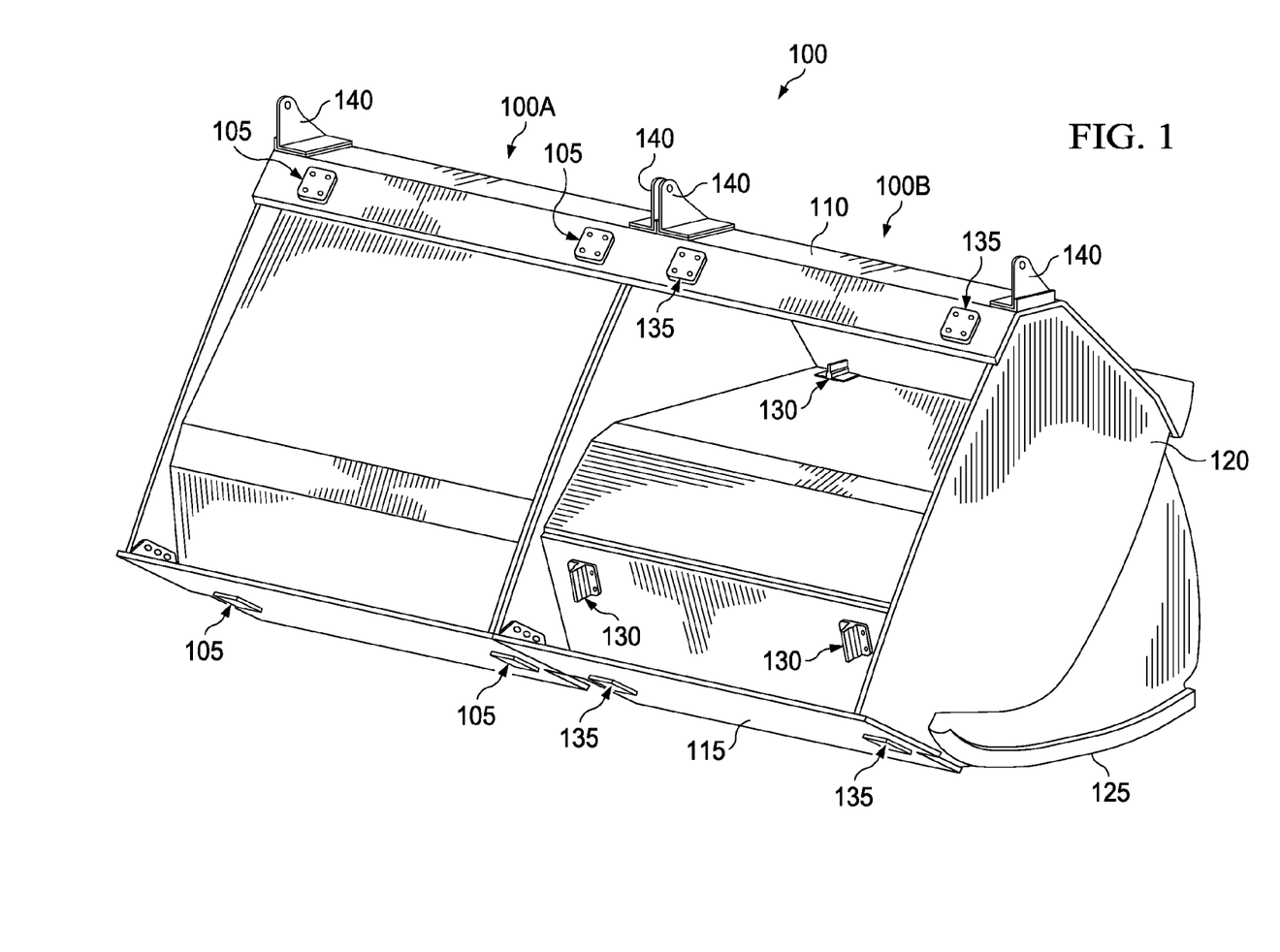
FIG. 1 is a perspective view of overhead stowage bin assemblies including shear fittings.

FIG. 1 is a perspective view of one embodiment of overhead stowage bin assemblies, generally designated by reference number 100 including shear fittings, generally designated by reference number 105. For purposes of illustration in this disclosure, the bin assemblies 100 include first and second bin assemblies 100A and 100B, and are described primarily with reference to an aircraft, such as, for example, the aircraft 600 illustrated in FIG. 6. The bin assemblies 100 can also be used, however, in other passenger vehicles, such as buses, trains, ships, etc.

For illustrative purposes, a reverse view of the bin assemblies 100 is shown, i.e., a view from the perspective of one located behind the bin assemblies 100 rather than the perspective of a passenger. In addition, first bin assembly 100A is shown in a closed position, and second bin assembly 100B is shown in an open position.

In the illustrated embodiment, each bin assembly 100A, 100B comprises an upper panel 110, a lower panel 115, two side panels 120, and a bucket 125. Each shear fitting 105 comprises a male component 130 and a female component 135, which become engaged when the bucket 125 is closed, as described in more detail below.

If desired, the bin assemblies 100 can be designed to have a traditional appearance and to be operated by passengers and flight crew in the same way as a conventional overhead stowage bin. For example, the upper panel 110, lower panel 115, and side panels 120 can be fabricated from a variety of suitable materials, such as composites, plastics, etc., and can be mounted to the ceiling and sidewalls of an aircraft passenger cabin using a variety of conventional techniques that are well-known to those of ordinary skill in the art. Exemplary mounting hardware 140 is illustrated in FIG. 1.

Similarly, the bucket 125 can be fabricated from a variety of well-known materials and can be designed to cooperate with the upper panel 110, lower panel 115, and side panels 120 using conventional techniques. For example, in the illustrated embodiment, the bucket 125 includes a standard pivot mechanism near the back and a latch mechanism near the front (not shown) such that the bin assemblies 100 can be opened and closed by operating the latch and rotating the bucket about the pivot, in a manner that is familiar to many airline passengers and flight crew. In other embodiments, the bin assemblies 100 can be opened and closed with an articulating mechanism or any other suitable mechanism for opening and closing the bin assemblies 100.

Figure 2A:
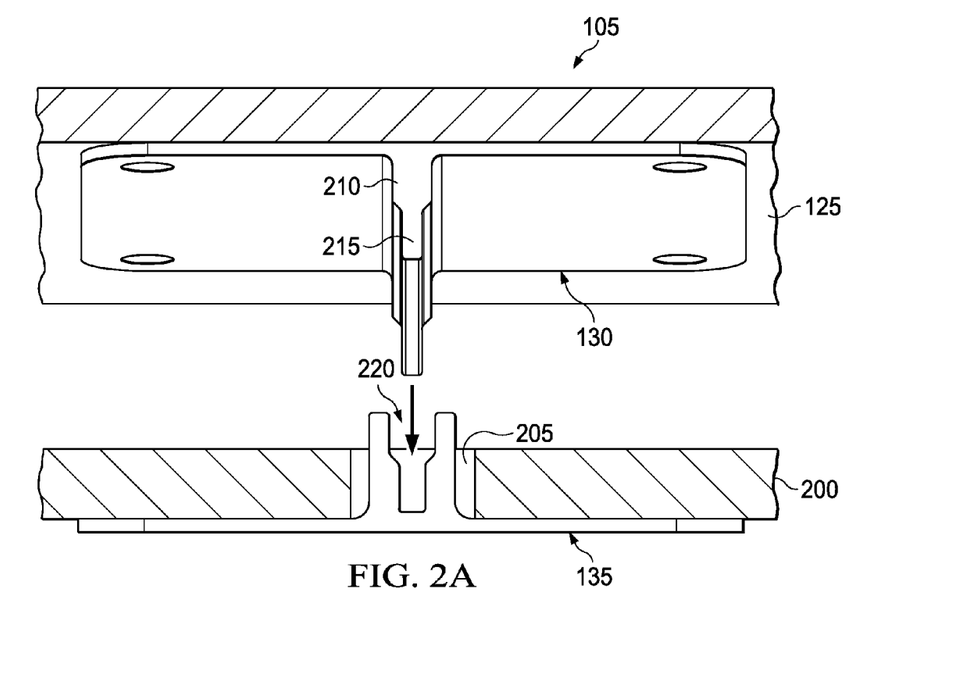
FIG. 2A is an end cross-sectional view of the shear fitting illustrated in FIG. 1 in an open position.
Figure 2B:
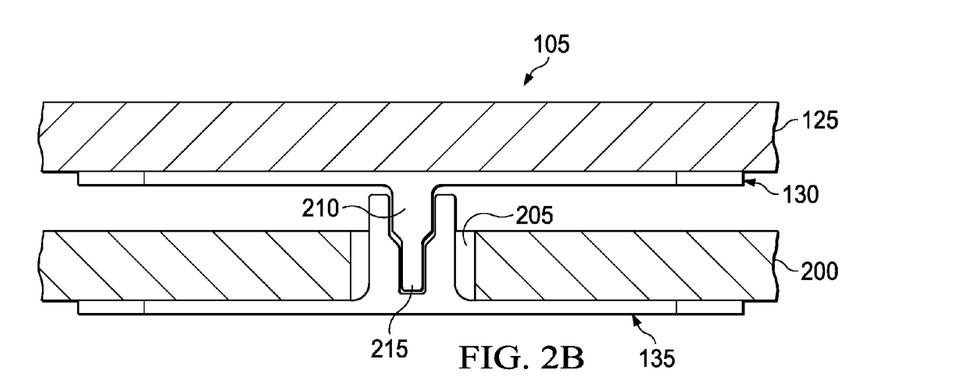
FIG. 2B is an end cross-sectional view of the shear fitting illustrated in FIG. 1 in a closed position.
Figure 3A:
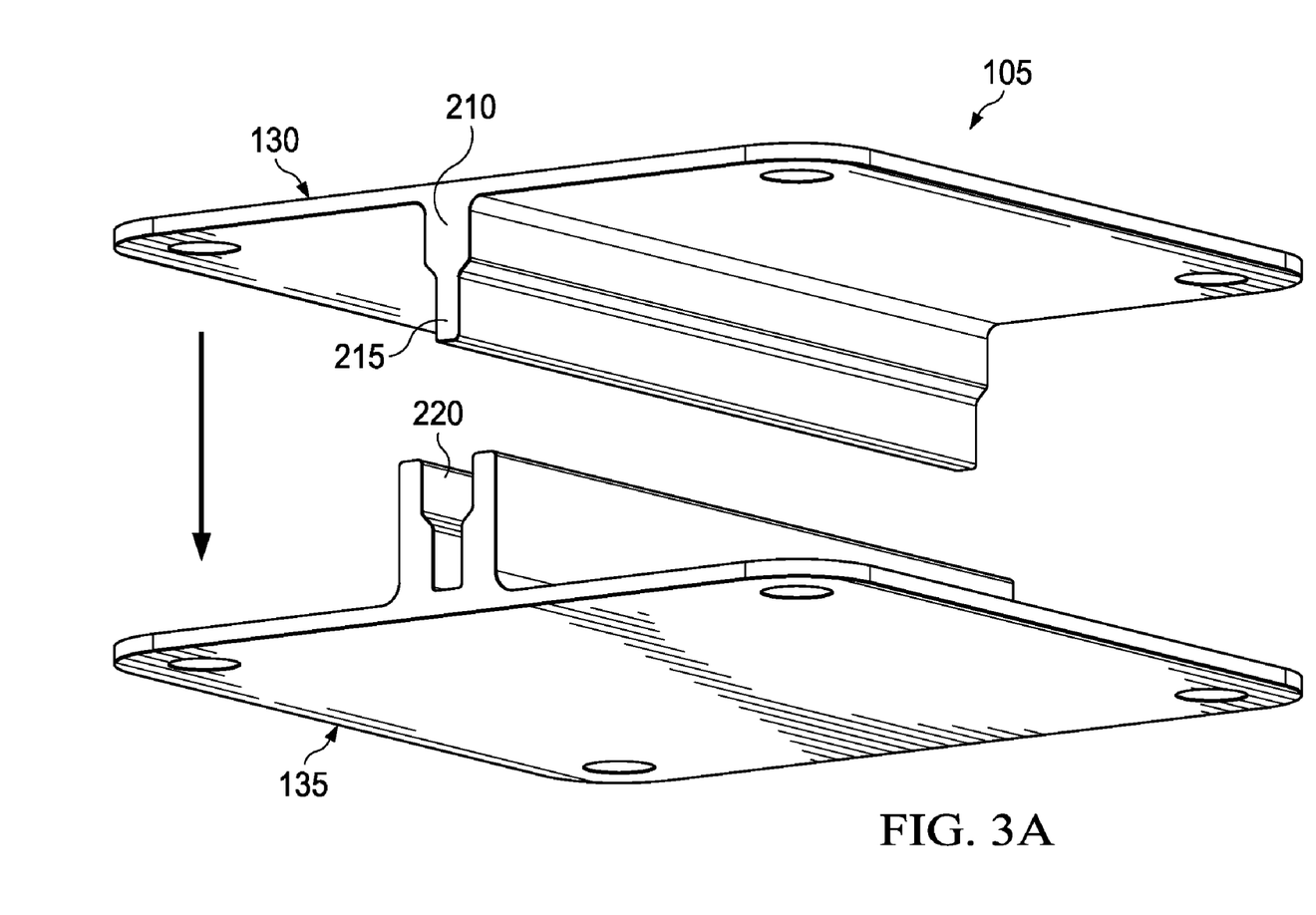
FIG. 3A is a perspective view of the shear fitting illustrated in FIG. 1 in an open position.
Figure 3B:
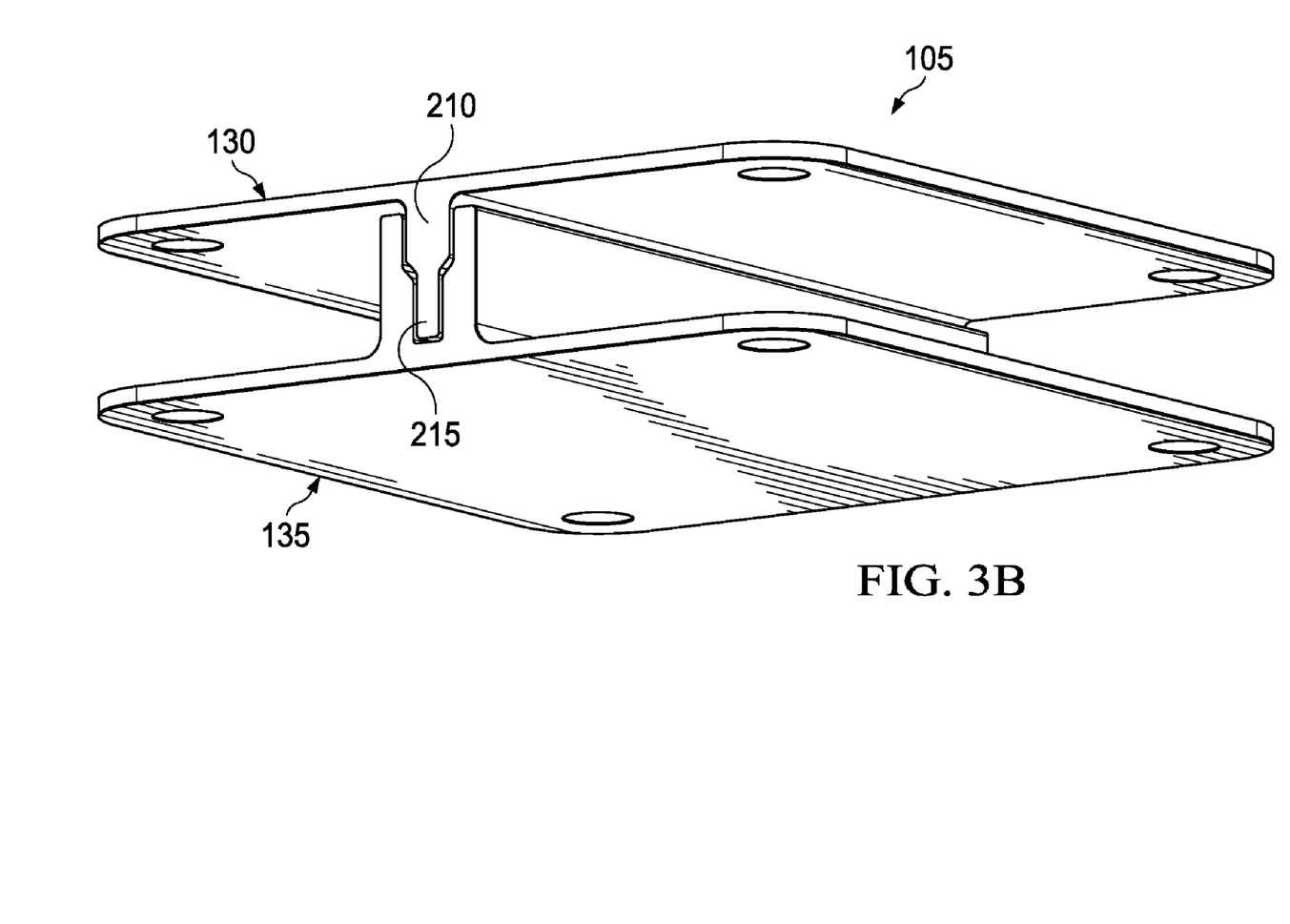
FIG. 3B is a perspective view of the shear fitting illustrated in FIG. 1 in a closed position.

FIGS. 2A and 2B and FIGS. 3A and 3B illustrate the embodiment of the shear fitting 105 shown in FIG. 1 in more detail. Specifically, FIG. 2A is an end cross-sectional view of the shear fitting 105 in an open position, and FIG. 2B is an end cross-sectional view of the shear fitting 105 in a closed position. FIG. 3A is a perspective view of the shear fitting 105 in an open position, and FIG. 3B is a perspective view of the shear fitting 105 in a closed position. For illustrative purposes, FIGS. 3A and 3B show the shear fitting 105 without the surrounding bin structures or support panels.

The shear fitting 105 comprises a male component 130 and a female component 135. In the illustrated embodiment, the male component 130 is attached to the bucket 125 of a bin assembly 100A, 100B, and the female component 135 is attached to a support panel 200 of a bin assembly 100A, 100B, such as the upper panel 110 or the lower panel 115. In other embodiments, the female component 135 may be attached to the bucket 125, and the male component 130 may be attached to the support panel 200. As shown in FIG. 1, a plurality of shear fittings 105 may be provided to attach each bucket to a support panel.

In some embodiments, the shear fitting 105 is designed such that the male component 130 engages with the female component 135 when the bin assemblies 100 are closed, as illustrated in FIGS. 2B and 3B. When so engaged, the shear fitting 105 is preferably designed to withstand a substantial shear force between the bucket 125 and the corresponding support panel 200 of the bin assemblies 100. Thus, when the bin assemblies 100 experience a forward load condition, such as a forward inertial load factor greater than about 1 g, the shear fitting 105 creates an efficient load path for the contents of the bin assemblies 100, as described in more detail below.

The male component 130 and the female component 135 of the shear fitting 105 may comprise any suitable material, such as, for example, metals (e.g., aluminum, steel, etc.), alloys, composites, etc. In addition, the male component 130 and the female component 135 of the shear fitting 105 can be attached to the corresponding structure of the bin assemblies 100 using any suitable method.

For example, in the illustrated embodiment, the male component 130 of the shear fitting 105 is surface mounted to the bucket 125 with a bonding adhesive and suitable fasteners, such as screws, rivets, etc. The female component 135 of the shear fitting 105 is embedded within the support panel 200 of the bin assemblies 100 by first creating a cavity 205 within the support panel 200. The female component 135 is then mounted to the back surface of the support panel 200 using a bonding adhesive and/or suitable fasteners, such as screws, rivets, etc. Many other suitable mounting configurations and techniques can be implemented for attaching the male component 130 and the female component 135 of the shear fitting 105 to the corresponding structure of the bin assemblies 100.

In some embodiments, the male component 130 and the female component 135 of the shear fitting 105 can be formed as integral parts of the bucket 125 and support panels) 200 of the bin assemblies 100 during the manufacturing process. For example, if the bucket 125 is manufactured using an injection molding process, the mold can be modified to include the male component 130 or female component 135 of the shear fitting 105, such that the appropriate component is formed as an integral part of the bucket 125 during manufacture.

In the illustrated embodiment, the male component 130 of the shear fitting 105 comprises a single extension having a thick portion 210 near the base and a thinner portion 215 near the tip. The female component 135 of the shear fitting 105 comprises a single groove 220 having a complementary cross-sectional profile to accommodate the male component 130. While this particular configuration presents certain structural advantages, numerous other suitable configurations are possible.

Figure 4:
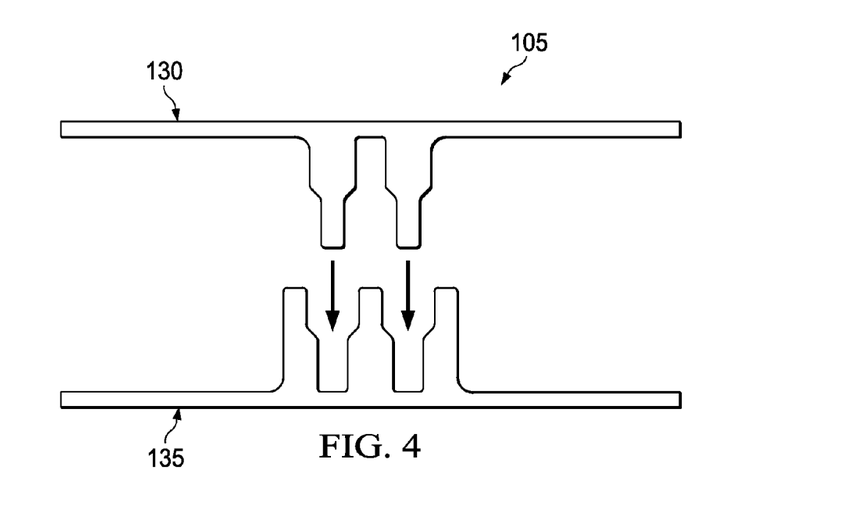
FIG. 4 illustrates one exemplary alternative embodiment of the shear fitting illustrated in FIG. 1.

For example, one alternative embodiment is illustrated in FIG. 4, in which the male component 130 of the shear fitting 105 comprises multiple extensions, and the female component 135 comprises a corresponding number of grooves. In other embodiments, the shear fitting 105 may comprise a mortise and tenon joint (not shown). As another example, the cross-sectional profile of the extensions) and grooves) may vary widely to optimize the performance of the shear fitting 105 in a given setting. For example, the male component 130 may comprise an angled or curved extension, if desired. Many other possible configurations of the shear fitting 105 will become apparent to those of ordinary skill in the art in view of the present disclosure, and are within the scope of this application.

Figure 5A:
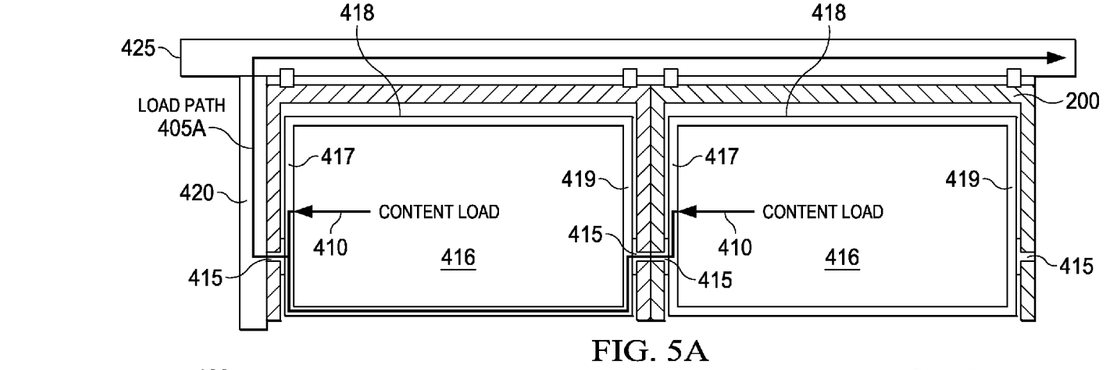
FIG. 5A is a block diagram illustrating the load path of a conventional overhead stowage bin under a forward load condition, such as a crash.

FIG. 5A is a block diagram illustrating the load path 405A of a conventional overhead stowage bin under a forward load condition, such as a crash. As illustrated, in the event of a forward load condition, the contents of the stowage bin apply a forward content load 410 within the bin. In some circumstances, the forward content load 410 can be quite significant. Therefore, current FAA regulations require that each overhead stowage bin be able to withstand an ultimate forward inertial load factor of 9 g.

One common approach for satisfying this requirement is illustrated in FIG. 5A. As shown, when the contents of the stowage bin apply a forward content load 410 against forward side wall 417 of a bucket 416, the forward side wall 417 channels the load 410 through a pivot boss 415 forward through the cabin until it reaches a large metallic or composite endframe 420 which, in turn, typically routes the load 410 to connecting panels (not shown) attached to the airframe 425, thereby creating the load path 405A illustrated in FIG. 5A. As shown in FIG. 5A, the forward content load is transmitted from a bucket to the airframe via the endframe 420.

Figure 5B:
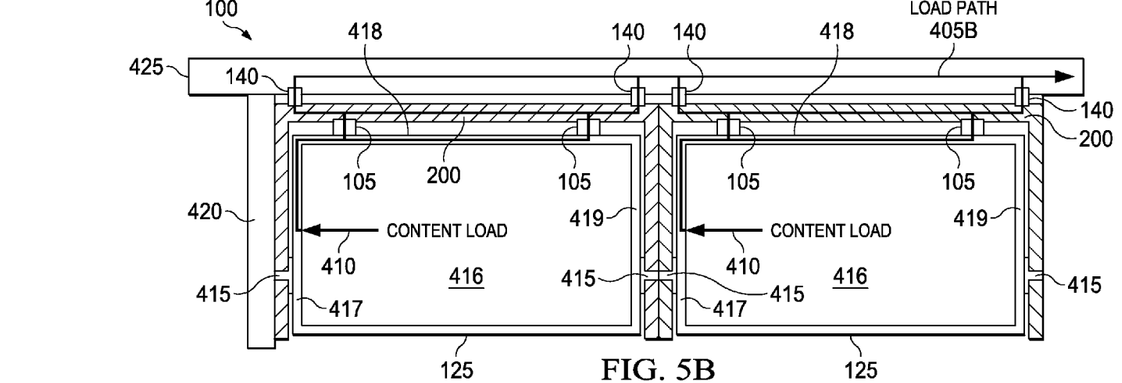
FIG. 5B is a block diagram illustrating the load path of a stowage bin assembly with shear fittings under a forward load condition, such as a crash.

FIG. 5B, by contrast, is a block diagram illustrating the load path 405B of a stowage bin assembly 100 with shear fittings 105 under a forward load condition, according to one embodiment of the present application. As shown, when the contents of a bin of the bin assemblies 100 apply a forward content load 410, a load path is provided that transmits the forward content load to the airframe 425 via the forward side wall 417 of a bucket to the lateral wall 418 of the bucket, between the forward side wall 417 and the rearward side wall 419 of the bucket, then to the shear fittings 105 which, in turn, route the load 410 directly to one or more support panels 200 (e.g., upper panel 110 or lower panel 115) attached to the airframe 425, thereby creating the load path 405B illustrated in FIG. 5B. Thus, the shear fittings 105 route the forward weight load from a bucket directly to at least one support panel mounted to the airframe under a forward load condition to create a more efficient load path 405B to the airframe 425, i.e., a more efficient means of transmitting forward weight load to the airframe, under forward load conditions, resulting in a number of advantages over conventional overhead stowage bins.

For example, as illustrated in FIG. 1, the bin assemblies 100 with shear fittings 105 can advantageously be designed without a strongback, or rear panel. In conventional overhead stowage bin design, a strongback panel is often necessary to provide sufficient structural support to satisfy the regulatory requirements for forward load conditions. By eliminating the need for a strongback panel, the shear fittings 105 can advantageously reduce the overall bulk and weight of the stowage bin assemblies 100. This can also simplify and lower the cost of the manufacturing process for the bin assemblies 100.

In addition, as shown in FIG. 5B, the shear fittings 105 create a load path 405B that bypasses the large metallic or composite endframes 420 typically required to handle forward loads in conventional overhead stowage bin design. As a result, certain endpanels can be made smaller or eliminated altogether, since they are used primarily for only vertical and lateral loads. Hence, a bin assembly with shear fittings 105 advantageously enables additional reductions in overall bulk and weight within the passenger cabin, as well as additional cost savings in materials and labor.

Referring now to FIGS. 7, 8, 9, and 10, further examples of shear fitting components and a shear fitting assembly are illustrated in accordance with an advantageous embodiment. FIGS. 7, 8, 9, and 10 illustrate different views and representations of a shear fitting assembly, and thus similar numbers are used throughout these figures to represent similar structures.

Figure 7:
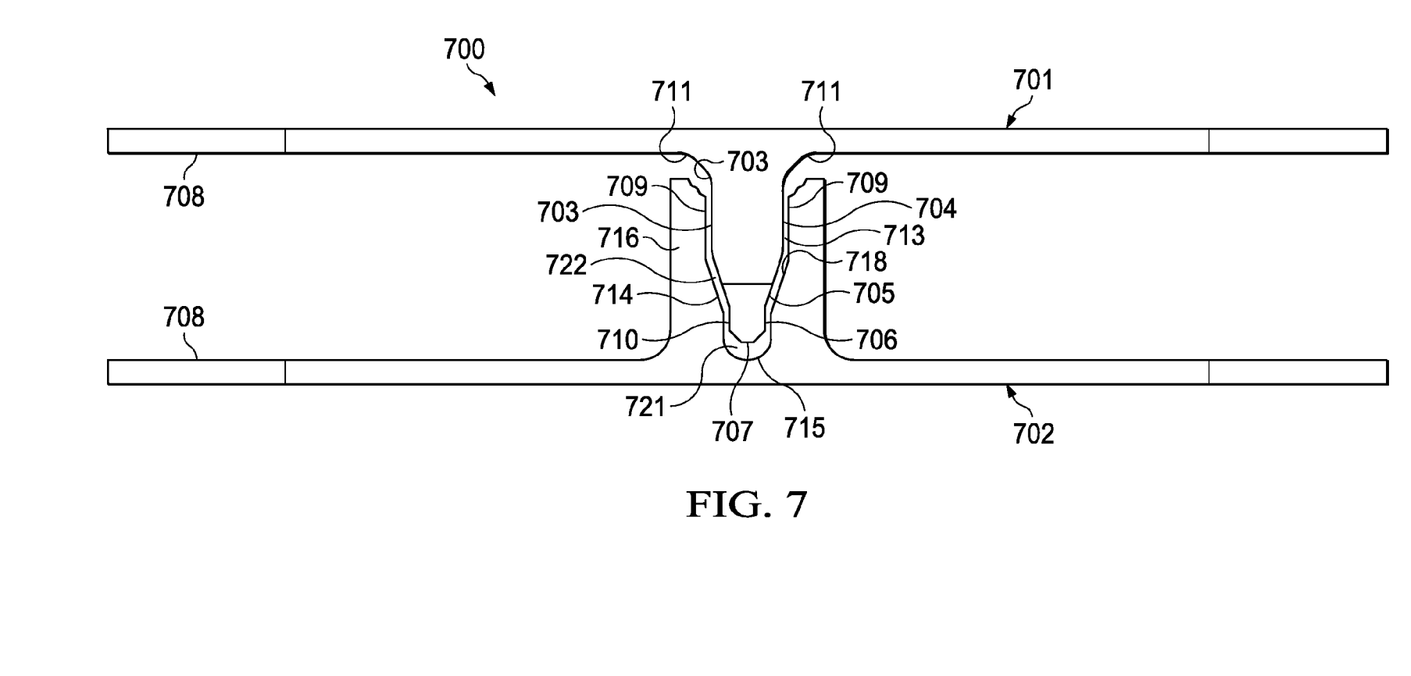
FIG. 7 is an end profile view of a shear fitting assembly in the closed position in accordance with an advantageous embodiment.
Figure 9:
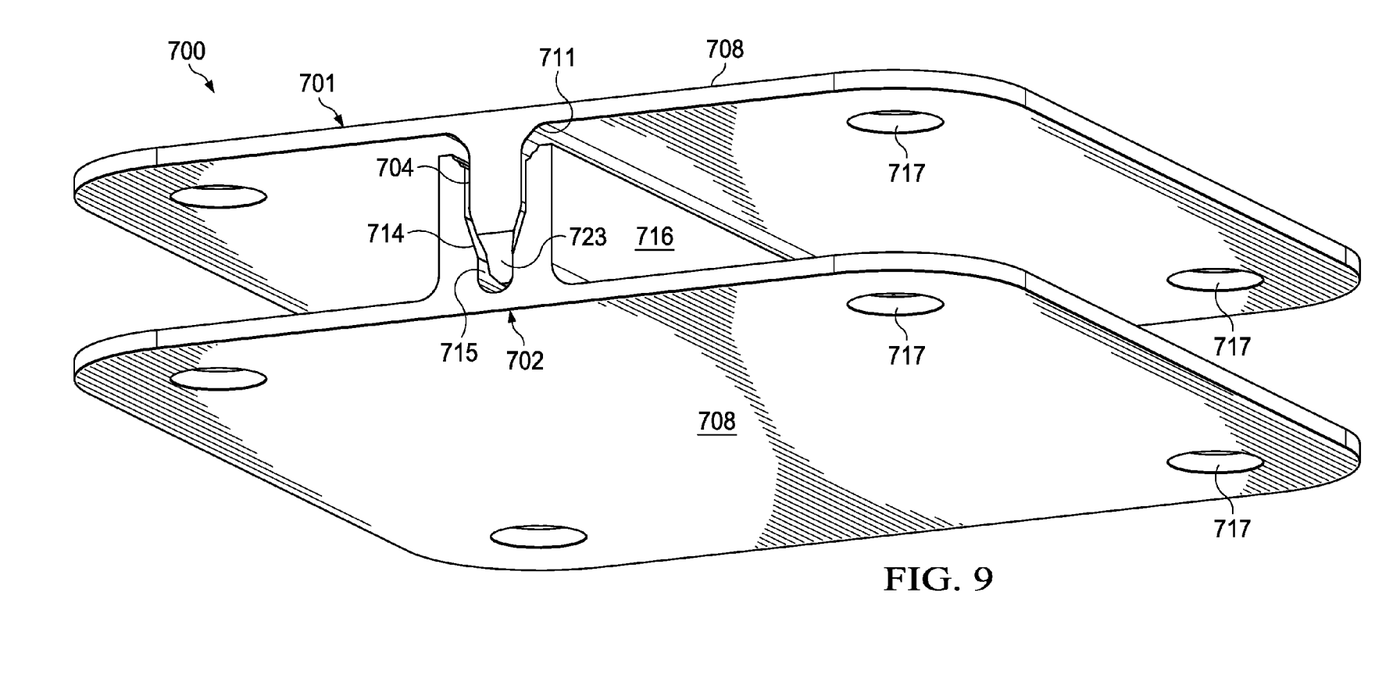
FIG. 9 is a perspective view of a shear fitting assembly in the closed position in accordance with an advantageous embodiment.
Figure 10:
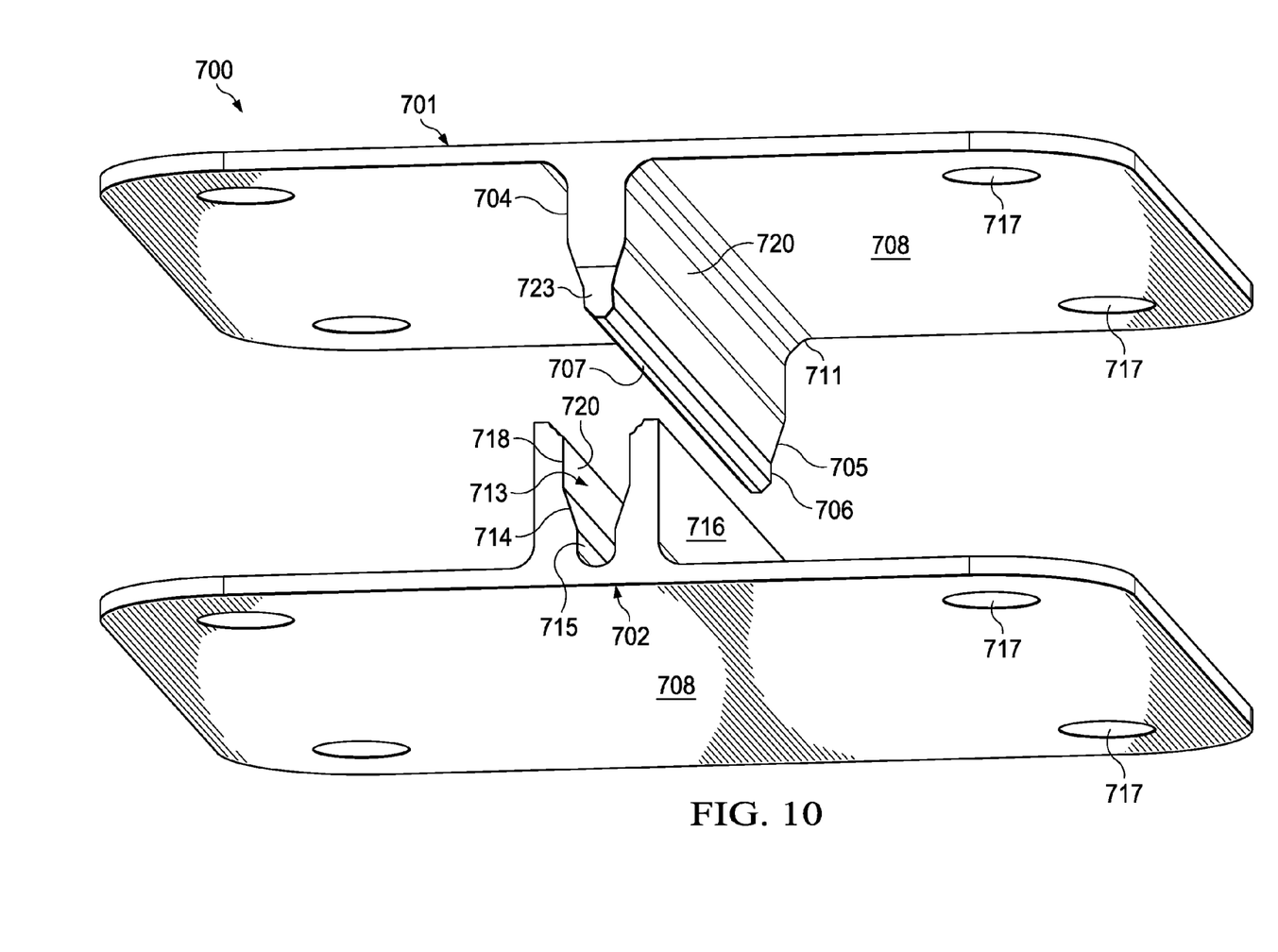
FIG. 10 is a perspective view of a shear fitting assembly in the open position in accordance with an advantageous embodiment.

In one embodiment, a shear fitting assembly 700 includes a pair of reciprocally engaging fittings. Individual shear fitting components in the assembly may be referred to as a male shear fitting component 701 and a female shear fitting component 702 or a first shear fitting component 701 and a second shear fitting component 702. FIGS. 7 and 9 show the shear fitting assembly 700 in the closed or engaged position; and FIGS. 8 and 10 show the assembly 700 in the open or disengaged position.

According to an advantageous embodiment, a male shear fitting component 701 comprises a profile 703 that includes a first wide region 704, a transition or shoulder region 705, and a second narrow region 706. The second narrow region 706 terminates in an end 707. Preferably, the end 707 is rounded, but it may take another shape such as squared, beveled, chamfered, or otherwise curved. The first wide region 704 defines a width that is larger than the width of the second narrow region 706. The first wide region 704 may be attached to a base or bracket 708 through which the male shear fitting component 701 may be affixed to an overhead storage bin or to a vehicle such as an aircraft or to other aircraft components. The first wide region 704 is characterized by opposing walls 709, which, in one embodiment, are generally straight and parallel to each other. Similarly, the second narrow region 706 is characterized by opposing walls 710, which are also generally straight and parallel to each other. In an advantageous embodiment, the walls 709 of the first wide region 704 and the walls 710 second narrow region 706 are substantially parallel and in alignment.

The shoulder region 705 provides a transition between the first wide region 704 and the second narrow region 706. The shoulder region 705 may be straight or curved. There may also be fillets 711 between each of the first wide region 704, the second narrow region 706, and the shoulder region 705.

Figure 8:
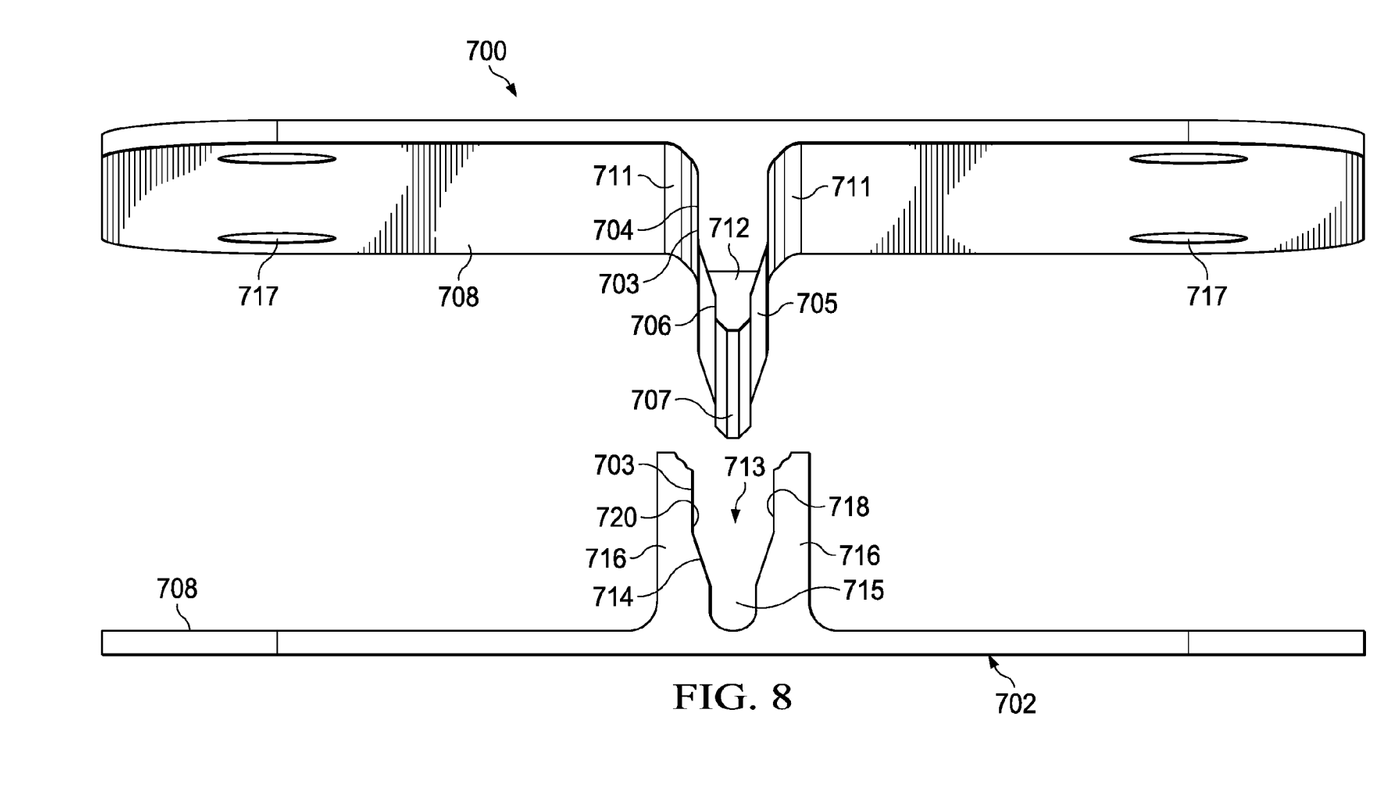
FIG. 8 is an end profile view of a shear fitting assembly in the open position in accordance with an advantageous embodiment.

Referring now to FIG. 8, in one advantageous embodiment, shoulder region 705 includes a substantially straight surface defined by a slope 712 of between approximately zero to approximately ninety degrees from the walls of the first region or second region. In a further advantageous embodiment, the slope 712 is between approximately 10 to approximately 45 degrees.

A female shear fitting component 702 comprises a profile 703 that defines receiving regions for receiving the male shear fitting component 701 in the closed position. The female shear fitting component 702 may have a profile 703 defining a first or wide receiving region 713, a shoulder or transition receiving region 714, and a second or narrow receiving region 715. The receiving regions in the female shear fitting component 702 are defined by fingers 716 or similar structures. Fingers 716 define an interior contour which, in combination with a second finger 716, defines the profile 703 of the female receiving regions.

The thickness of each finger 716 may be the same or different. First receiving region 713 of the female shear fitting component 702 may further be defined by opposing walls 718 which, in an advantageous embodiment are substantially straight and parallel. Additionally second receiving region 715 of the female shear fitting component 702 may also be defined by opposing walls 718 which are substantially straight and parallel. Both sets of walls 718 of the first receiving region 713 and second receiving region 715 may be parallel and in alignment. The shoulder receiving region 714 may define a slope 712 which substantially matches that of the slope 712 of the shoulder region 705 of the male shear fitting component 701.

The female shear fitting component 702, like male shear fitting component 701, may also include a bracket or base plate 708. Base plate 708 may be attached to the second region 715, and the bracket may include holes 717, or other devices, to facilitate connection of the shear fitting component to another structure. Holes 717 may receive fasteners such as, by way of example only, bolts, rivets, or screws to facilitate attachment.

In practice, the two components, the male shear fitting component 701 and the female shear fitting component 702, in a pair of shear fitting components, are mutually positioned such that they can mutually engage and disengage with one another. For example, when used in connection with a storage bin assembly, a first shear fitting component 701 may be disposed on a surface of the storage bin. A first surface of the storage bin may include a lateral wall of the storage bin. The second shear fitting component 702, the other shear fitting component in the pair that matches with the first shear fitting component, may be disposed on a surface of the vehicle. A vehicle surface would include the vehicle fuselage or frame. In an aircraft, a surface of the vehicle would further include a vehicle frame affixed to the fuselage or a bin support panel affixed to a frame or fuselage. ("Stowage" and "Storage" are used interchangeably).

Figure 6:
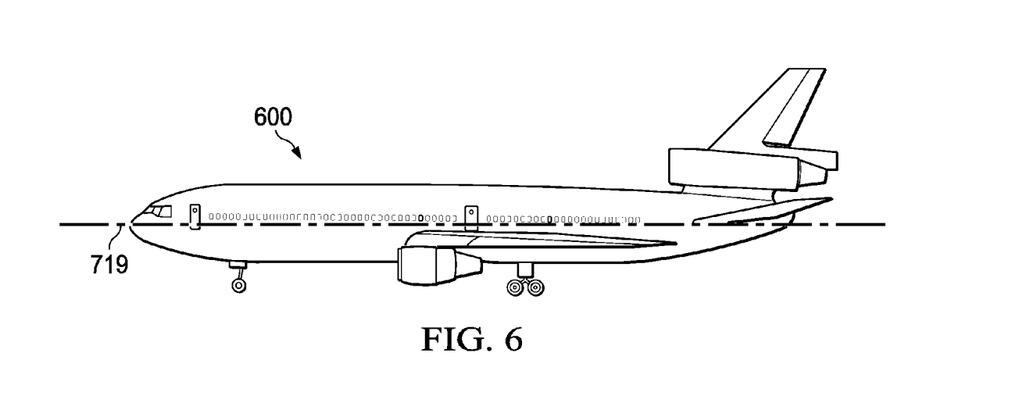
FIG. 6 is a schematic of an aircraft as may include overhead stowage bin assemblies with shear fittings.

The two shear fitting components 701 and 702 may be mutually positioned such that they may closely engage. Further, the engagement is such that in the closed position as shown in FIGS. 7 and 9, the shear fitting assembly 700 acts to receive shear forces acting on the storage bin. Thus, a face 720 of the shear fitting components 701 and 702 may be positioned so as to be normal or substantially normal to a center line 719 of the vehicle 600 as shown in FIG. 6. Thus, when a vehicle such as an airplane 600 experiences acceleration or deceleration shear forces, the force, which may often be exerted substantially along the center line 719 of the airplane 600, following the airplane's course of movement, is received at the mass of the overhead storage bin. The force on the overhead storage bin is then transferred to the shear fitting assembly 700. As previously explained, the shear fitting assembly 700 then efficiently transfers the shear force to the vehicle frame or fuselage. Advantageously, the shear fitting assembly 700 provides an efficient transfer of shear forces while reducing or minimizing the weight necessary for the overhead bin assembly. In one advantageous embodiment, the overall weight of the shear fitting assembly 700, the combination of the male shear fitting component 701 and the female shear fitting component 702, is between approximately 0.13 pounds to approximately 0.18 pounds. While a configuration of face 720 of shear fitting assembly 700 so as to be substantially normal to the center line 719 of the vehicle allows for an efficient transfer of shear forces, other arrangements are also possible.

In other advantageous embodiments, the male shear fitting component 701 may comprise a profile having a single region. One example of a single region profile is a profile with a generally uniform width. Another single region profile is a wedge shape or a curved shape in the profile. Other embodiments may comprise a profile defining two regions. A two region profile may comprise a first region with a substantially uniform width and a second region defining a wedge or curve shape. A female shear fitting component can also be configured with a corresponding receiving region. Thus, a female shear fitting component can also be configured with a single receiving region or with a first receiving region and a second receiving region.

A further aspect of the shear fitting assembly 700 is the ease with which it may be opened and closed. Dimensions of the male shear fitting component 701 and the female shear fitting component 702 may be selected so as to allow for easy opening and closing of the fittings. As the assembly 700 transitions from the open to the closed position, the male shear fitting component 701 comes into proximity with the female shear fitting component 702. The width of the male narrow region 706 is selected so that it can easily fit within the female wide receiving region 713 during closing. The female wide receiving region 713 acts to capture the male fitting when the second narrow region 706 first comes into contact with the female fitting 702. This is advantageous when, for example, the alignment of the male and female fittings has slightly shifted. During loading or because of heavy usage, the alignment of the fittings that was set during fabrication or repair may fall slightly askew or out of alignment. Thus, for example, during operation the box may move and the loading in an overhead storage bin may be uneven; nevertheless, as described above, the width of the first wide receiving region 713 in the female shear fitting component 702 acts to receive the second narrow region 706 of the male shear fitting component 701. Thus an intermediate position, or a first engagement position, describes that relative positioning of the male shear fitting component 701 and the female shear fitting component 702 when the second narrow region 706 of the male shear fitting component is positioned within the first receiving region 713 of the female shear fitting component 702.

As the second narrow region 706 of the male shear fitting component 701 continues to move into a fully closed position, the second narrow region 706 may contact the shoulder receiving region 714 of the female shear fitting component 702. The angle of the shoulder receiving region 714 acts to further funnel the second narrow region 706 into a central or aligned position. By this centering action, the second narrow region 706 of the male shear fitting component is guided into the second or narrow receiving region 715 of the female shear fitting component 702.

The male shear fitting component 701 can now move into its fully closed position with respect to the female shear fitting component 702 as shown in FIGS. 7 and 9. When closed, the second or narrow region 706 of the male shear fitting component 701 is closely engaged with the second or narrow receiving region 715 of the female shear fitting component 702. The shoulder region 705 of the male shear fitting component 701 is closely engaged with the shoulder receiving region 714 of the female shear fitting component, and the first or wide region 704 of the male shear fitting component is closely engaged with the first or wide receiving region 713 of the female shear fitting component 702. Close engagement generally means that proximity of engagement so as to allow for efficient transfer of shear forces. In an advantageous embodiment, the male shear fitting component 701 is disposed with respect to the female shear fitting component 702 in the closed position such that the total clearance between the two components is between approximately 30 to approximately 50 thousandths of an inch. Total clearance here means the sum of the clearance on one side, a left side for example and the other side, the right side. Thus, the clearance between one wall 709 of the male shear fitting component 701 and an opposite wall 718 of the female shear fitting component is between approximately 15 to approximately 25 thousands of an inch.

A further advantage of the shear fitting assembly 700 is the quiet nature of the assembly 700 in the closed position. The curved, chamfered, and filleted configuration of the male component 701 and female component 702 minimizes rattles and miscellaneous noise that arise from shaking and oscillation during normal vehicle operation. Space 721 may optionally be provided between the tip or end 707 of male shear fitting 701 and the bottom of the female shear fitting component 702 so as to further provide for a quiet operation in the closed position. An optional space 722 between the shoulder region 705 and shoulder receiving region 714 also enhances quiet operation when provided. Male shear fitting 701 may also be provided with end beveling 723. End beveling 723 both assists in the easy entry of male shear fitting 701 into female shear fitting 702 as the fittings move to a closed position. Further, end beveling 723 further provides for quiet operation.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. An overhead stowage bin assembly for a vehicle comprising at least one shear fitting, the assembly comprising:
  a first shear fitting component disposed on a lateral wall of the overhead stowage bin, wherein the first shear fitting component defines a profile having a first region, a shoulder region, and a second region, wherein the first region is thicker than the second region, and wherein the shoulder region transitions between the first region and the second region;
  a second shear fitting component attached to a bin support panel of the vehicle, wherein the second shear fitting component defines a profile having a first receiving region, a shoulder receiving region, and a second receiving region, and wherein the first receiving region is wider than the second receiving region, and wherein the shoulder receiving region transitions between the first receiving region and the second receiving region; and
  the first component and the second component of the at least one shear fitting being disengaged when the overhead stowage bin is in the open position, and being engaged when the overhead stowage bin is in the closed position, such that in the closed position, the first region of the first shear fitting is closely engaged within the first receiving region of the second shear fitting, the shoulder region of the first shear fitting is closely engaged with the shoulder receiving region of the second shear fitting, and the second region of the first shear fitting is closely engaged within the second receiving region of the second shear fitting.

2. The assembly of claim 1 further comprising a plurality of pairs of first and second shear fittings.

3. The assembly of claim 1, wherein the shear fitting assembly is disposed in an airplane, wherein the first shear fitting component and the second shear fitting component are positioned in the closed position such that shear forces on the overhead storage bin assembly from deceleration or acceleration substantially along a center line of the airplane are transferred to the shear fitting.

4. The assembly of claim 1 wherein the first shear fitting component and the second shear fitting component are positioned in the closed position such that a face of the shear fitting is substantially normal to a center line of an airplane.

5. A storage bin and shear fitting assembly, the assembly configured to transition between an open position, a first engagement position, and a closed position, the assembly comprising:
  a surface of the overhead storage bin;
  a vehicle frame;
  a male shear fitting component, the male shear fitting component defining a profile having a first region, a shoulder region, and a second region, wherein the first region is thicker than the second region, and wherein the shoulder region transitions between the first region and the second region;
  a female shear fitting component, the female shear fitting component defining a profile having a first receiving region, a shoulder receiving region, and a second receiving region, and wherein the first receiving region is wider than the second receiving region, and wherein the shoulder receiving region transitions between the first receiving region and the second receiving region;
  either the male shear fitting component or the female shear fitting component is disposed on the surface of the overhead storage bin, and the other shear fitting component is disposed on the vehicle frame;
  wherein the male shear fitting component and the female shear fitting component are disengaged in the open position;
  wherein in the first engagement position the second region of the male shear fitting is disposed within the first receiving region of the female shear fitting; and
  wherein in the closed position the first region of the male shear fitting is closely engaged within the first receiving region of the female shear fitting, the shoulder region of the male shear fitting is closely engaged with the shoulder receiving region of the female shear fitting, and the second region of the male shear fitting is closely engaged within the second receiving region of the female shear fitting.

6. The assembly according to claim 5 wherein the storage bin comprises an overhead storage bin.

7. The assembly according to claim 5 wherein the profile of the first region of the male shear fitting is characterized by a first wall and a second wall, and wherein the first wall and the second wall are substantially straight and parallel to each other, and wherein the profile of the second region of the male shear fitting is characterized by a first wall and a second wall, and wherein the first wall and the second wall of the second region are substantially straight and parallel to each other.

8. The assembly according to claim 5 wherein a width of second region of male shear fitting is less than a width of the first receiving region of female shear fitting.

9. The assembly according to claim 5 wherein the shoulder region of the male shear fitting and the shoulder receiving region of the female shear fitting is characterized by a slope of between approximately 10 to approximately 45 degrees from the vertical.

10. The assembly according to claim 5 wherein the male shear fitting further comprises a base bracket and wherein the female shear fitting further comprises a base bracket.

11. The assembly according to claim 5 wherein in the closed position a clearance between the male shear fitting and the female shear fitting is between approximately 30 to approximately 50 thousandths of an inch in total.

12. The assembly according to claim 5 wherein the combined weight of the male shear fitting and the female shear fitting is between approximately 0.13 to approximately 0.18 pounds.

13. The assembly according to claim 5 wherein the vehicle frame is attached to an airplane fuselage.

14. The assembly according to claim 5 wherein the vehicle frame comprises an airplane fuselage.

15. The assembly according to claim 5 wherein the vehicle frame comprises a bin support panel.

16. The assembly according to claim 5 wherein the surface of the overhead storage bin comprises a lateral wall of the overhead storage bin.

17. The assembly according to claim 5 wherein the male shear fitting further comprises one of a rounded tip and a chamfered tip.

18. The assembly according to claim 5 wherein the shoulder region of the male shear fitting and the shoulder receiving region of the female shear fitting is characterized by being one of curved or substantially straight.

19. The assembly according to claim 5 wherein in the closed position a space is defined between a tip of the male shear fitting and a bottom of the female shear fitting.

20. The assembly according to claim 5 wherein a lateral edge of the male shear fitting is chamfered.

21. An overhead storage bin and shear fitting assembly, the assembly configured to transition between an open position, a first engagement position, and a closed position, the assembly comprising:
  a lateral wall of the overhead storage bin;
  a bin support panel;
  a male shear fitting component, the male shear fitting component defining a profile having a first region, a shoulder region, and a second region, wherein the first region is thicker than the second region, and wherein the shoulder region transitions between the first region and the second region;
  a female shear fitting component, the female shear fitting component defining a profile having a first receiving region, a shoulder receiving region, and a second receiving region, and wherein the first receiving region is wider than the second receiving region, and wherein the shoulder receiving region transitions between the first receiving region and the second receiving region;
  either the male shear fitting component or the female shear fitting component disposed on the lateral wall, and the other shear fitting component disposed on the bin support panel;

wherein the male shear fitting component and the female shear fitting component are disengaged in the open position;

wherein in the first engagement position the second region of the male shear fitting is disposed within the first receiving region of the female shear fitting;

wherein in the closed position the first region of the male shear fitting is closely engaged within the first receiving region of the female shear fitting, the shoulder region of the male shear fitting is closely engaged with the shoulder receiving region of the female shear fitting, and the second region of the male shear fitting is closely engaged within the second receiving region of the female shear fitting; and wherein the male shear fitting and the female shear fitting are positioned in the closed position such that a face of the male and female shear fittings is substantially normal to a center line of an airplane.

* * * * *